United States Patent [19]

Fukushima

[11] Patent Number: 4,865,395
[45] Date of Patent: Sep. 12, 1989

[54] BRAKE PIPE ARRANGEMENT FOR AUTOMOTIVE VEHICLE

[75] Inventor: Masao Fukushima, Machida, Japan
[73] Assignee: Nissan Motor Co., Ltd., Yokohama, Japan
[21] Appl. No.: 221,796
[22] Filed: Jul. 20, 1988
[30] Foreign Application Priority Data
Jul. 25, 1987 [JP] Japan .................. 62-114450[U]
[51] Int. Cl.⁴ .............................................. B60T 17/04
[52] U.S. Cl. .................... 303/87; 188/204 R; 303/1; 303/86
[58] Field of Search ............... 303/111, 110, 9, 75, 303/87, 86; 188/266, 151 A, 204 R

[56] References Cited

U.S. PATENT DOCUMENTS 3,680,314  8/1972  Toomey ..................... 188/151 A
3,888,551  6/1975  Neves ....................... 188/151 A

FOREIGN PATENT DOCUMENTS

8/103152  11/1981  World Int. Prop. O. .......... 303/111

Primary Examiner—Andres Kashnikow
Assistant Examiner—Mark Le
Attorney, Agent, or Firm—Foley & Lardner, Schwartz, Jeffery, Schwaab, Mack, Blumenthal & Evans

[57] ABSTRACT

To shift the resonant (peak) hydraulic pressure vibration frequency, caused when hydraulic pressure varies by brake unit torque fluctuations due to worn-away brake rotor for instance, away from the brake shimmy generation range (e.g. 10 to 17 Hz), an auxiliary pipe is additionally connected between a first pipe connecting the master cylinder to the right side hydraulic cylinder and a second pipe connecting the master cylinder to the left side hydraulic cylinder in the vicinity of the two hydraulic cylinders.

3 Claims, 4 Drawing Sheets

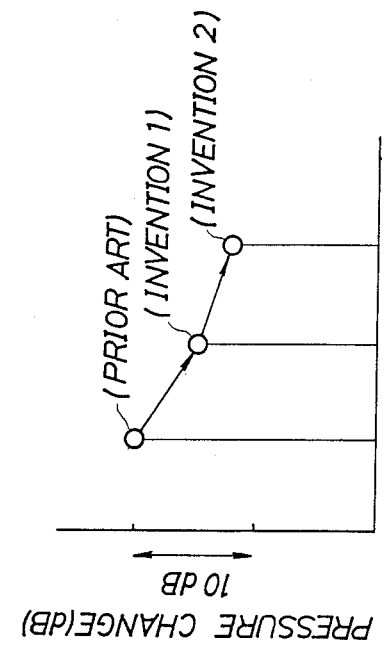

BRAKE PIPE ARRANGEMENT FOR AUTOMOTIVE VEHICLE

BACKGROUND OF THE INVENTION

1. Field of the Invention

The present invention relates generally to a brake pipe arrangement for an automotive vehicle and more specifically to a brake pipe arrangement which can reduce abnormal oscillation of brake units.

2. Description of the Prior Art

In usual, vehicle brake can be obtained by supplying hydraulic pressure generated from a master cylinder when a brake pedal is depressed to brake cylinders of brake units provided for front and rear wheels. The brake pipe arrangement for supplying hydraulic pressure to the brake units can be classified into two, front-rear split type and diagonal split type. In the above front-rear split type, a front wheel pipe connected to a front hydraulic pressure port of a master cylinder is branched into two, right and left, front wheel brake cylinders, while a rear wheel pipe connected to a rear hydraulic pressure port of the master cylinder is branched into two, right and left, rear wheel brake cylinders.

In the prior-art brake pipe arrangement for an automotive vehicle, the length of the split pipes extending from the split point to each brake cylinder is roughly equal to each other; that is, a difference in brake pipe length between the right and left wheel brake cylinders is relatively small from the vehicle structural standpoint. Therefore, when a wall thickness of a brake rotor is worn away and therefore brake torque of one brake unit varies, hydraulic pressure fluctuates or vibrates, so that the brake system tends to vibrate at a low frequency (e.g. 10 to 15 Hz). The above hydraulic pressure vibration is transmitted from the right brake unit cylinder to the left brake unit cylinder or vice versa via the two split pipes.

FIG. 1(A) shows the prior-art relationship between the frequency and the phase difference in hydraulic pressure between the two right and left brake cylinders, in which the dot-dashed line indicates the phase difference (degree) obtained when the hydraulic pressure changes in the right brake cylinder and then the changed pressure is transmitted to the left brake cylinder, and the dot-dot-dashed line indicates the phase difference (degree) obtained when the hydraulic pressure changes in the left brake cylinder and then the changed pressure is transmitted to the right brake cylinder. The small difference between the two lines results from a difference in length of pipes extending from the master cylinder (or the branch point) to the two right and left brake cylinders.

Further, FIG. 1(B) shows the prior-art relationship between the frequency and the hydraulic pressure change in the two right and left brake cylinders, in which the dot-dashed line indicates the pressure change (dB) obtained when the hydraulic pressure changes in the right brake cylinder and then the changed pressure is transmitted to the left brake cylinder, and the dot-dot-dashed line indicates the pressure change (dB) obtained when the hydraulic pressure changes in the left brake cylinder and then the changed pressure is transmitted to the right brake cylinder. Further, in FIG. 3(B), the dashed line indicates the relationship between frequency and torque change in one brake cylinder obtained when torque changes in the other brake cylinder.

With reference to FIGS. 1(A) and (B), since the phase difference between the two cylinders is about 90 degrees at 10 Hz (brake cylinder hydraulic pressure vibration frequency), the pressure change is relatively low. However, when the vibration frequency increases from 10 Hz to 20 Hz, since the phase difference increases from 90 to 180 degrees, the pressure change also increases up to the peak resonant point $R_0$ as shown in FIG. 1(B).

On the other hand, since this hydraulic pressure vibration frequency range from 10 to 18 Hz corresponds to the frequency range during which brake shimmy (an abnormal oscillation in the front wheels of a motor vehicle reinforced by resonance at critical speeds) is generated, there exists a problem in that the brake shimmy phenomenon is accelerated and therefore there exists a need of eliminating hydraulic pressure fluctuations or torque vibration; that is, it is necessary to strictly match the thickness of one side brake rotor to that of the other side brake rotor. In other words, in the prior-art brake units, it has been necessary to often replace the brake units with a new set of brake units, thus resulting in poor workability and higher cost.

SUMMARY OF THE INVENTION

With these problems in mind, therefore, it is the primary object of the present invention to provide a brake pipe arrangement for an automotive vehicle which can shift the peak (resonant) frequency of hydraulic pressure vibration within the brake cylinder caused by changes in brake rotor wall thickness, for instance away from the brake shimmy frequency range (10 to 18 Hz) in order to minimize brake unit vibration.

To achieve the above-mentioned object, a brake pipe arrangement for connecting a master cylinder to right and left brake unit cylinders for an automotive vehicle, according to the present invention, comprises: (a) a first pipe, connected between the master cylinder and the right brake unit cylinder, for supplying hydraulic pressure generated by the master cylinder to the right brake unit cylinder; (b) a second pipe, connected between the master cylinder and the left brake unit cylinder, for supplying hydraulic pressure generated by the master cylinder to the left brake unit cylinder; and (c) an auxiliary pipe, connected between said first and second pipes in the vicinity of the two right and left brake unit cylinder, for reducing an equivalent vibration mass of a brake system including the master cylinder and the two brake unit cylinders.

The diameter of the automotive pipe is equal to or larger than that of the first and second pipes. When the diameter of the auxiliary pipe is equal to that of the first and second pipes, the length of the auxiliary pipe is determined shorter than a sum of lengths of both the first and second pipes.

In the brake pipe arrangement of the present invention, since an auxiliary pipe is additionally connected between the two right and left brake unit cylinders near the two cylinders, it is possible to reduce an equivalent mass of the brake pipe arrangement and therefore to increase the hydraulic pressure peak (resonant) frequency from a point $R_0$ to a point $R_1$ (both shown in FIG. 1B) away from the brake shimmy generation range, thus minimizing the brake unit vibration.

BRIEF DESCRIPTION OF THE DRAWINGS

FIG. 6 is a graphical representation for assistance in explaining the effect of the present invention.

DETAILED DESCRIPTION OF THE PREFERRED EMBODIMENTS

Figure 2:
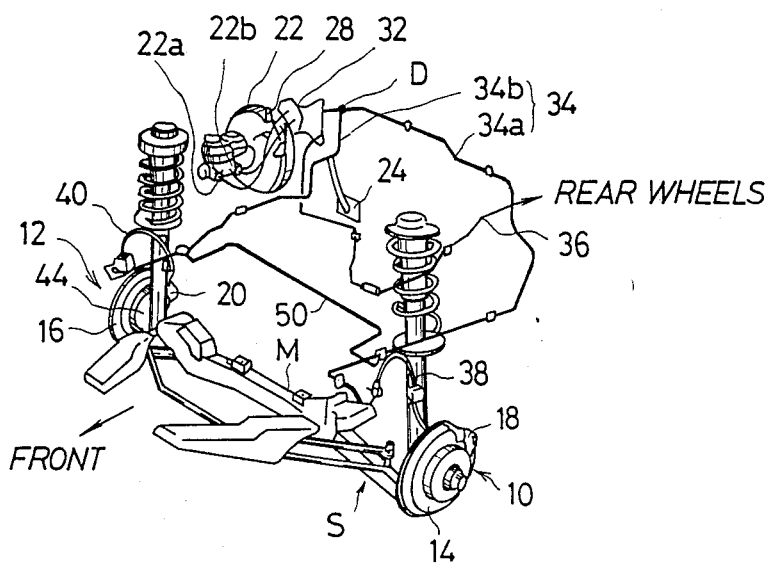
FIG. 2 is a perspective view showing an embodiment of the brake pipe arrangement for an automotive vehicle according to the present invention, which is provided for a pair of front wheel brake units.

FIG. 2 shows a brake pipe arrangement according to the present invention, which is applied to a pair of front wheel brake units. In the drawing, a pair of front wheel, left and right, brake units 10 and 12 are of disc brake type, in which each caliper 18 or 20 is provided so as to sandwich the circumferential edge portion of each brake rotor 14 or 16 and each brake cylinder 42 or 44 is provided for each caliper 18 or 20 to actuate it. When hydraulic pressure is applied from a master cylinder 22 to the brake cylinder 42 or 43, two brake pads attached to the caliper 18 or 20 are brought into pressure contact with the brake rotor 14 or 16 for generating frictional braking force, respectively.

In FIG. 2, a brake pedal 24 is linked with a master cylinder 22. Therefore, when the brake pedal 24 is depresed, a braking hydraulic pressure is generated within the master cylinder 22. The master cylinder 22 is provided with a front hydraulic pressure port 22a and a rear hydraulic pressure port 22b. The front hydraulic pressure port 22a is connected to a proportioning value 32 via a pipe 28 and then to the two front brake units 10 and 12 via two front (left and right) pipes 34a and 34b, separately.

On the other hand, the rear hydraulic pressure port 22b is connected to the proportioning value 32 via pipe 30 and then to two rear brake units (not shown) via a rear pipe 36.

This front pipe 34 is branched at a branch point D near the proportioning value 32 into two front (left and right) pipes 34a and 34b and then connected to two rubber hose 38 and 40 near two suspensions S, separately. These two rubber hoses are connected to two brake cylinders 42 and 44 of the brake units 10 and 12 separately, as shown in FIG. 2. Further, in FIG. 2, an auxiliary pipe 50 is connected between the two front (left and right) pipes 34a and 34b near the two rubber hoses 38 and 40 or the two brake units 10 and 20.

Figure 3:
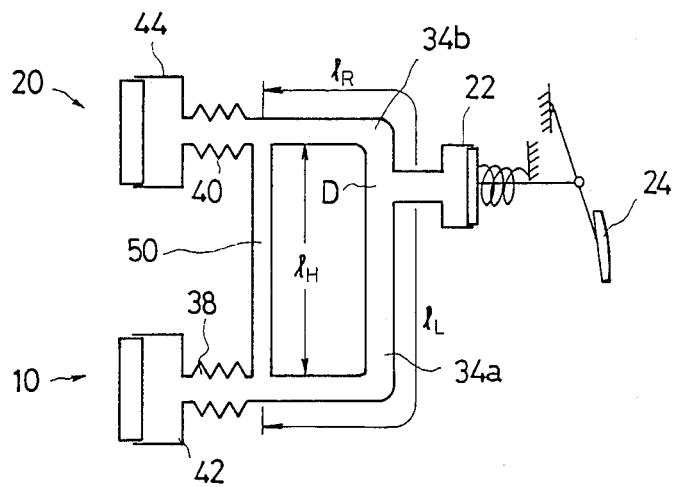
FIG. 3 is a simplified diagrammatical illustration showing the brake pipe arrangement shown in FIG. 2.

FIG. 3 is a more simplified representation of the brake pipe arrangement shown in FIG. 2, in which the same reference numerals as in FIG. 2 are used. In FIG. 3, the reference numeral 44 denotes the right side brake cylinder; 42 denotes the left side brake cylinder; and 50 denotes the auxiliary pipe 50.

In FIGS. 2 and 3, the feature of the brake pipe arrangement according to the present invention is to connect the two front pipes 34a and 34b by an auxiliary pipe 50 near each brake cylinder 42 or 44 or each rubber hose 38 or 40 in order to increase the equivalent mass of the brake unit vibration system, that is, to shift the resonant frequency of the pipe arrangement away from the brake shimmy generation range. In FIG. 3, $l_R$ denotes a right side pipe length from the master cylinder 22 to the rubber hose 40; $l_L$ denotes a left side pipe length from the master cylinder 22 to the rubber hose 38; and $l_H$ denotes an auxiliary pipe length.

The resonant (peak) frequency characteristics $R_1$ (shown in FIG. 1B) of the brake pipe arrangement of the split-type front wheel brake units 10 and 12 are subjected to the rigidity of the calipers 18 and 20, the rigidity of brake pedal 24, equivalent masses of brake oils within various pipes, and equivalent stiffness of the various pipes, etc. The equivalent mass and the equivalent stiffness of the pipe including brake oil are determined by the pipe dimensions (e.g. pipe diameter and pipe length).

Figure 4:
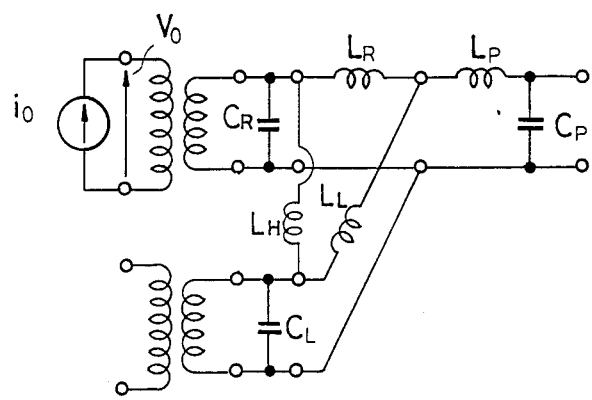
FIG. 4 is an equivalent vibration circuit corresponding to the brake pipe arrangement shown in FIG. 3.

FIG. 4 shows an equivalent vibration circuit roughly corresponding to the brake pipe arrangement shown in FIG. 3, in which $L_L$ denotes an equivalent mass of the left pipe 34a extending from the branch point D to the rubber hose 38; $C_L$ denotes an equivalent stiffness of the left pipe 34a; $L_R$ denotes an equivalent mass of the right pipe 34b extending from the branch point D to the rubber hose 40; $C_R$ denotes an equivalent stiffness of the right pipe 34b; $C_R$ denotes an equivalent stiffness of the right pipe 34b; $L_P$ denotes an equivalent mass of the master cylinder side pipe; $C_P$ denotes an equivalent stiffness of the master cylinder side pipe; and $L_H$ denotes an equivalent mass of the auxiliary pipe 50. Further, in FIG. 4, a constant current source $i_0$ indicates that a hydraulic pressure change is assumed to be produced on the right side brake unit 20.

Figures 5A, 5B:
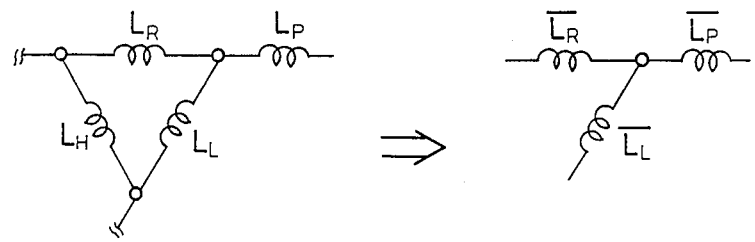
FIG. 5(A) is a vibration circuit diagram showing a delta-shaped inductance (equivalent mass) circuit structure.
FIG. 5(B) is another vibration circuit diagram showing a pi-shaped inductance (equivalent mass) circuit structure.

When taking into consideration of only the masses, the equivalent vibration circuit shown in FIG. 4 can be simplified into a delta-shaped inductance connection circuit as shown in FIG. 5(A). This delta-shaped circuit can further be transformed into a pi-shaped circuit as shown in FIG. 5B in accordance with a transformation formula as follow:

$$\overline{L_L} = \frac{L_H \cdot L_L}{L_R + L_H + L_L} \quad (1)$$

$$\overline{L_R} = \frac{L_R \cdot L_H}{L_R + L_H + L_L} \quad (2)$$

$$\overline{L_P} = L_P + \frac{L_R \cdot L_L}{L_R + L_H + L_L} \quad (3)$$

where $L_L$, $L_R$ and $L_P$ denote equivalent masses of right side pipe, left side pipe, and master side pipe, respectively all including the mass $L_H$ of the auxiliary pipe 50.

Here, assumption is made that both pipes 34a and 34b are the same in length (as $L_L=L_R$) and the auxiliary pipe is arranged along the pipes 34a and 34b (as $L_H=2L_L=2L_R$).

Then, the following relationship can be obtained from the expressions (1) and (2) as $$\overline{L_L}=\overline{L_R}=L_L/2=L_R/2$$

Here, if the length of the auxiliary pipe 50 is determined to be equal to that of the pipe 34a or 34b (as $L_H=L_L=L_R$), the following relationship can be obtained from the expressions (1) and (2) as $$\overline{L_L}=\overline{L_R}=L_L/3=L_R/3$$

When the diameter of the auxiliary pipe 50 is two times larger than that of the pipe 34a or 34b (as $L_H=L_R/4$), the following relationship can be obtained from the expressions (1) and (2) as $$\overline{L_L}=L_L/9 \; \overline{L_R}=L_R/9$$

Here, when the diameter of a pipe is increased by n times, the mass of oil within the pipe is increased by $n^2$ times. However, since the impedance $Z_0$ when seen from the brake cylinder side is reversely proportional to the fourth power of the diameter ($d^4$), the impedance is increased by $n^{-4}$ times. Therefore, the equivalent mass of the pipe is increased by $n^{-2}$ times in total.

Figure 1:
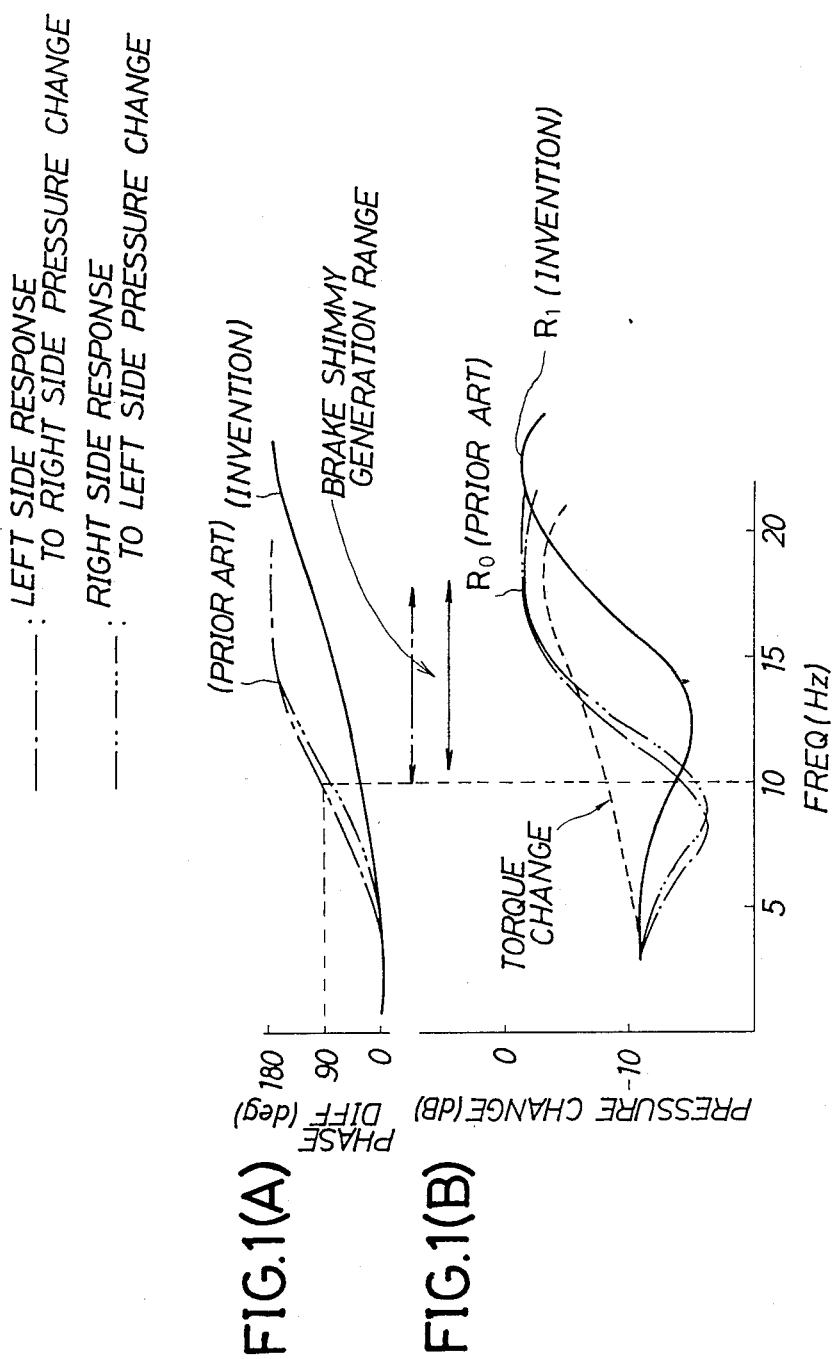
FIG. 1(A) is a graphical representation showing the relationship between phase difference in hydraulic pressure between two, right and left, brake cylinders and hydraulic pressure vibration frequency, in which the prior-art relationship is shown by dot-dashed and dot-dot-dashed lines and the relationship of the present invention is shown by a solid line.
FIG. 1(B) is a grapical representation showing the relationship between hydraulic pressure change and hydraulic pressure vibration frequency, in which the prior-art relationship is shown by dot-dashed and dot-dot-dashed lines and the relationship of the present invention is shown by a solid line, togther with torque change within one cylinder caused by hydraulic pressure change within the other cylinder.

In summary, when the length of the auxiliary pipe 50 is determined shorter than the total length of the two branch pipes 34a and 34b or when the diameter of the auxiliary pipe 50 is increased, it is possible to reduce the equivalent mass of the vibration system of the brake pipe arrangement, so that the resonant (peak) frequency $R_1$ of the hydraulic pressure vibration is increased in FIG. 1(B) away from the brake shimmy generation range (e.g. 10 to 18 Hz) for prevention of brake pipe vibration caused when the wall thickness of the disk rotor is worn away.

In FIG. 1(A), the solid line indicates the relationship of the present invention between the frequency and the phase difference in hydraulic pressure between the two right and left brake cylinders when hydraulic pressure changes in one brake cylinder. In FIG. 1(B), the solid line indicates the relationship of the present invention between the frequency and the hydraulic pressure change in the two right and left brake cylinder when hydraulic pressure changes in one brake cylinder. These drawings indicate that the phase difference between the two brake cylinders is decreased and therefore the pressure change or the resonant frequency $R_1$ is increased away from the brake shimmy generation range.

FIG. 6 shows an effect of the present invention, in which the pressure change between the two brake cylinders can be reduced in the present invention at vibration frequency within the brake shimmy generation range in comparison with the prior-art pipe arrangement including no auxiliary pipe 50.

The invention 1 indicates a drop of the hydraulic pressure change obtained when the auxiliary pipe 50 with a length and a diameter susbstantially equal to that of the right or left side pipe 34a or 34b (half of the total length of two pipes 34a and 34b) is connected and the invention 2 indicates a drop of the hydraulic pressure change obtained when the auxiliary pipe 50 with a length substantially equal to the right or left side pipe 34a or 34b and a diameter 1.5 times larger tan that of the right or left side pipe 34a or 34b.

In the prsent invention, the auxiliary pipe 50 can be arranged along a side surface of an engine room or along the suspension member M.

Although the length of the pipe 50 can be determined according to the vehicle width, it is possible to arrange the auxiliary pipe 50 shorter than the main right and left side pipes 34a or 34b. As already expained, the diameter of the auxiliary pipe 50 is determined at least equal to or larger than that of the main right and right side pipes 34a and 34b.

Further, in the brake pipe arrangement according to the present invention, since only the auxiliary pipe 50 is added without modifying the ridigity or dimensions of the brake calipers 28 and 20 or the brake pedal 24, no harmful influence is exerted upon the brake force or brake function of the brake unit.

As described above, in the brake pipe arrangement according to the present invention, since the right and left brake oil pipes are connected by an auxiliary bypass pipe in order to increase the equivalent vibration mass of the brake system, it is possible to shift the resonant hydraulic pressure frequency of the brake system, vibrated when hydraulic pressure varies due to worn-away disk rotors, away from the brake shimmy generation range, it is possible to effectively prevent the brake unit and brake pipe arrangement from normal vibrations.

What is claimed is:

1. A brake pipe arrangement connected between a master cylinder and right and left brake unit cylinders for an automotive vehicle, to shift resonant frequency of hydraulic pressure vibrations, caused when hydraulic pressure is varied by brake unit torque fluctuations, away from a brake shimmy generation range, comprising:
    (a) a first pipe, connected between the master cylinder and the right brake unit cylinder, for supplying hydraulic pressure generated by the master cylinder to the right brake unit cylnder;
    (b) a second pipe, connected between the master cylinder and the left brake unit cylinder, for supplying hydraulic pressure generated by the master cylinder to the left brake unit cylinder; and
    (c) means, including an auxiliary pipe connected solely between said first and second pipes in the vicinity of the two right and left brake unit cylinders, for reducing an equivalent vibration mass of a brake system including the master cylinder and the two brake unit cylinders.

2. The brake pipe arrangement of claim 1, wherein a diameter of said auxiliary pipe is equal to or larger than that of said first and second pipes.

3. The brake pipe arrangement of claim 1, a length of said auxiliary pipe is shorter than a sum of lengths of said first and second pipes when a diameter of said auxiliary pipe is equal to that of said first and second pipes.

* * * * *